United States Patent Office
3,613,435
Patented Oct. 19, 1971

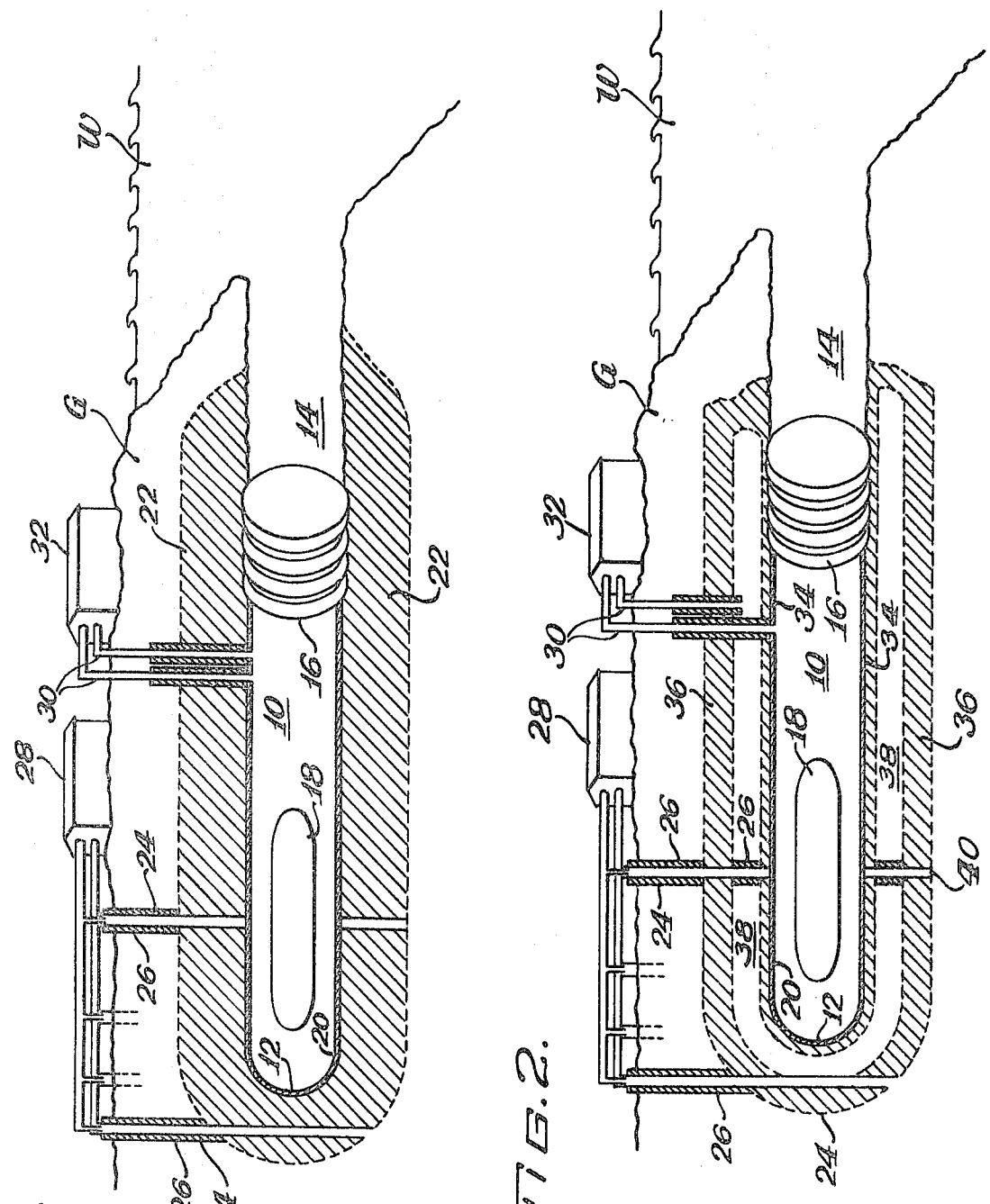

3,613,435
METHOD AND SYSTEM FOR STATIC TESTING STRUCTURES
Philip J. Anderson, Deerfield, Ill., assignor to Institute of Gas Technology
Filed Apr. 16, 1970, Ser. No. 29,011
Int. Cl. G01m 3/02, 10/00
U.S. Cl. 73—37         12 Claims

ABSTRACT OF THE DISCLOSURE

A method and system for pressure testing a large test specimen exteriorly. A test chamber is excavated in an earth formation for receiving the test specimen. An entry is provided in the formation to the test chamber permitting the passage of the specimen. Water is frozen in the earth formation around the test chamber and a closure member is provided in the entry so as to withstand the pressure load imparted to the specimen in the chamber. Pump members are provided for introducing a pressurized fluid, such as water, into the chamber so as to static pressure test the test specimen at desired test pressures.

BACKGROUND OF THE INVENTION

Field of the invention

This invention relates to a method and system for pressure testing large specimens which heretofore have been pressure tested by passage of the specimen to selected depths in the sea to provide the desired hydrostatic pressure.

Internally pressurized vessels are commonly provided for receiving structures and applying static external pressure to them to determine experimentally the strength of the structure in withstanding external loads. By such external pressure testing it is possible, by actual experimentation, to determine the external pressure limit of the particular structure.

One of the limitations in providing such testing facilities is size of the structure to be tested. The size of a testing vessel which can be economically constructed using materials, such as metal or concrete, is also limited by the pressure level of the test.

It would be possible to construct large vessels underground and use the mass of the earth overburden to resist the internal pressure. However, the higher the test pressure, which is needed the greater will be the amount of overburden required. Thus, the vessel will have to be constructed deeper as the test pressures increase. Of course, the deeper the burial, the greater the cost. Further, the depth is limited by the techniques used to excavate an underground chamber, which has practical limitations.

By using present techniques, it is therefore practically impossible to pressure test large specimens, such as those in the range of three to four hundred feet in length by fifty to seventy-five feet in diameter, particularly at high pressures, such as one-thousand to two-thousand p.s.i. Obviously, the size and strength requirements of a test chamber for testing a structure of such a size would be prohibitively expensive. The only known way in which such a large structure could be tested at such pressures would be to actually submerge the test specimen to a sea depth which would provide the desired test pressure. One very serious problem encountered with this procedure is that the test specimen could be lost if there is a failure of the structure at extreme depths which the test specimen is placed.

Thus, although methods are known by which large structures can be tested for determining ability to overcome external pressure, these methods have very serious limitations.

SUMMARY OF THE INVENTION

It is therefore an important object of this invention to provide a method and system for pressure testing large test specimens wherein many of the problems of the prior art techniques are overcome.

It is also an object of this invention to provide an improved method and system for pressure testing large structures at relatively high pressures wherein the test vessel used is constructed below ground level but at depths which can be excavated by conventional techniques.

It is a further object of this invention to provide a large test chamber for pressure testing specimens at high pressures wherein the test chamber is formed below ground level with access to the chamber through an entryway which interconnects to a body of water to thereby provide for ease of access of the test specimen to the test chamber.

It is another object of this invention to provide an improved method and system for pressure testing large test specimens at relatively high pressures by providing a test chamber in an earth formation, wherein the earth formation, around the chamber is frozen so as to effectively increase the earth overburden, thereby withstanding the internal pressure in the chamber for testing a particular structure.

It is also another object of the invention to provide a system and method for pressure testing large test structures at relatively high pressures wherein the chamber is constructed below ground and the earth around the outside is frozen so as to effectively increase the overburden and access to the test chamber is provided through a water passageway.

Further purposes and objects of this invention will appear as the specification proceeds.

All of the foregoing objects are accomplished by a method and system for pressure testing a large test specimen wherein an earth formation is provided and a test chamber is formed in the earth formation for receiving the test specimen. The surrounding earth formation is frozen and an entry is provided to the test chamber to provide a passage to pass the test specimen therethrough. Pumps are provided for introducing pressurized water into the chamber so as to apply external pressure to the test specimen. A pressure closure is provided in the entry way so as to withstand the pressure in the chamber whereby the pressure in the chamber can be raised to the desired test pressures.

BRIEF DESCRIPTION OF DRAWINGS

Particular embodiments of the present invention are illustrated in the accompanying drawings wherein:

FIG. 1 is a schematic, vertical cross-sectional view of my system for pressure testing large specimens at elevated pressures; and FIG. 2 is a view similar to FIG. 1 showing an alternate, preferred embodiment of the invention.

DETAILED DESCRIPTION OF THE PREFERRED EMBODIMENT

Referring to FIG. 1, a test chamber 10 is excavated below ground level. The size of the chamber 10 is determined by the size, or by length and diameter, of the specimens which are to be tested. For example, a test specimen which is 75 feet in diameter and 400 feet long will require a test chamber constructed to provide sufficient clearance for the specimen in the chamber, such as a test chamber which is 450 feet long and 100 feet in diameter. Preferably, the underground chamber 10 is constructed entirely in a rock formation so that it will have the greatest strength.

Desirably, the test chamber 10 is constructed with a circular, vertical cross-section so as to reduce the stress concentrations in the surrounding rock. The end 12 of the chamber 10 is preferably hemispherical in shape for the same reasons. The depth of the chamber below ground level is determined by the internal pressure to which the chamber will be subjected because the greater the depth, the greater will be the actual overburden to withstand the test pressures. In addition, the depth will be related to the thickness which is frozen around the test chamber 10.

Preferably, the test chamber is excavated by smooth wall blasting mining methods or by the use of boring machines. Such techniques reduce the depth of fracturing of the surrounding and supporting rock formation and also simplify the provision of a lining 20 in the chamber, which is advantageously used.

Preferably, the test chamber 10 is constructed below the level of a body of water, such as the surface of the ocean. An access or entry way 14 is provided between the test chamber 10 and the body of water W. The cross section of the entry way 14 is of a size which permits the safe insertion of a test vessel, and it preferably provides a straight-in access of the test structure 18 to the test chamber 10. The entry 14 is preferably slanted upwardly during the mining of the entry 14 from the interior of the test chamber 10 so as to simplify the mining of the chamber 10 and to keep costs at a minimum. Such slanting also assists in keeping the test chamber 10 free of water during construction. The length of the entry 14 is determined by the requirement to have the test chamber 10 surrounded by a sufficient volume of rock to permit adequately thick frozen zones at the entry side of the chamber so there will be no fracturing of the rock, leading to failure of the chamber.

In order to raise the pressure in the test chamber 10 to the desired pressure, a closure 16, such as a multiple bulkhead, must be provided in the entry 14 to thereby isolate the test chamber 10 from the exterior during pressure testing. The bulkhead 16 is movable so as to provide free and easy insertion and removal of the test specimen 18. Desirably, a recess (not shown) is provided adjacent the bulkhead. The bulkhead 16 is slideably movable on track members into such a recess. Alternatively, the bulkhead 16 is swingably mounted in the entry 14 so as to swing in and out of the entry.

The stress loads in the rock around the bulkhead 16 in the entry 14 are maintained at the same radial relationship as the stress loads in the rock around the test vessel 10. This is advantageously accomplished by the use of the multiple bulkhead 16 wherein each separate bulkhead is designed to withstand a differential pressure with only a fractional difference between the test pressure and the pressure in the exterior of the entry. For example, a 500 p.s.i. differential is provided between each of four bulkheads when the test pressure is 2000 p.s.i. A suitable seal (not shown) is provided between the bulkhead assembly 16 and the wall of the entry. The pressure load in the test chamber 10 is transferred directly to the rock surrounding the entry or tunnel 14 in a relatively narrow band.

Alternative to the bulkhead, a freezing method is useful. A thick plug of ice is frozen in the entry way by use of freeze pipes (not shown) which extend down into the entryway 14. Such freeze pipes must be movable in and out of the passageway 14 so that the test structure may pass into the chamber. After the test specimen 18 has been moved into the test chamber 10, the ice plug (not shown) is frozen in place. This method has the important advantage that the freezing ice molds itself to the irregularities of the rock in the entryway 14. After testing is completed, the ice plug is melted by passing a warming fluid through the freeze pipes.

Preferably, a liner 20 is provided in the test chamber. Although frozen rock is not permeable to water, it is preferred to use the liner 20 because during the construction of the chamber, the liner 20 assists in controlling water influx into the chamber 10. After construction, it is left in place. The liner 20 also provides assurance of the integrity of the test chamber 10 and also assists in preventing raveling of the frozen rock surface defining the chamber 10. Any suitable material, such as vinyl, can be used for the liner. Preferably, pressure grouting (not shown) is used to fill the spaces between the rock formation surrounding the test chamber 10 and the liner. The liner 20 is not designed to withstand test chamber pressure as it merely transmits the pressure to the surrounding rock formation. The liner 20 also assists in preventing water from escaping from the test chamber 10 to the surrounding supporting earth formation.

The most important aspect of our method and system for pressure testing large specimens at relatively high pressures is the technique of freezing the zone around the test chamber. The frozen zone 22 is shown in FIG. 1 and extends from the inner wall of the test chamber 10 radially outwardly a sufficient distance so as to provide a water tight pressure chamber 10. This radial extension by freezing effectively increases the overburden which acts to withstand the pressure in the chamber 10. The overburden, that is, the earthen mass over a cavity below ground level normally gradually increases in width as the vertical distance from the cavity increases. This increase in width, as at an angle, is referred to as the angle of break. The freezing of the earth formation around the cavity thereby has been found to increase the overburden in proportion to the thickness of the frozen zone at any given vertical distance below ground level.

The frozen zone 22 is created by conventional techniques used in the construction industry. Wells are drilled into the rock, lined with a pipe, and a smaller diameter pipe is placed down the center of the well pipe to thereby provide heat exchanger pipes 24. Refrigerant is then pumped down the small pipe and it rises in the annular space between the inner pipe and the outer pipe to accomplish freezing of the desired thickness. At the areas which are not to be frozen, insulation is used.

These heat exchanger pipes 24 with insulation 26 thereround are shown schematically in the accompanying drawings. Although the drawings show a single heat exchanger pipe 24, a frozen zone requires a plurality of such pipes. Preferably, the frozen zone 22 is formed after the completion of the construction of the test chamber. The heat exchanger pipes 24 are preferably installed before or simultaneous with the construction of the test chamber 10. The pipes 24, which pass below the test chamber 10 are routed around the walls defining the chamber, not only to maintain the symmetry of the frozen zone, but also to permit the entry of a test specimen 18 into the chamber 10 after the construction of the test facility has been completed.

A refrigeration plant, shown schematically, generally 28, is provided for pumping the refrigerant down through the heat exchanger pipes 24. Any type of mechanical refrigeration plant may be used. For example, a conventional compressor type refrigeration system may be utilized.

A pressurized piping system 30 is provided with a pressure outlet extending into the test chamber 10. Pumps or compressors (not shown) are enclosed within the housing 32 at ground level for pumping a pressurized fluid, advantageously water, into the chamber after the specimen 18 has been placed therein and after the bulkhead 16 has been closed and sealed in the entry 14. Other pressurizing fluids such as air or liquid anti-freeze may also be used to advantage.

As an alternate and preferred system and method for constructing the frozen zone 20, the system shown in FIG. 2 is used. As disclosed in patent application Ser. No. 825,687, filed May 19, 1969, the chamber 10 has an outer frozen ring, an inner frozen ring, and an intermediate zone is controllably frozen so that there is an internal stress built up in the intermediate zone during its freezing. This provision of an internal stress provides added strength for the inner ring of the structure, enabling it to withstand the pressure developed in the test chamber 10, without cracking the structure since the surrounding rock formation thereby develops strength in tension.

A relatively thin, impermeable shell 34 is first frozen in the earth formation immediately around the test chamber 10. After freezing this thin, impermeable shell 34 around the test cavity 10, a thick outer ring 36 is frozen and spaced outwardly of the inner ring 34, resulting in an unfrozen zone therebetween. The rock in the area between the thin ring 34 and the thick ring 36 is then frozen as freezing progresses inwardly from the outer frozen ring 36. As more of the water confined between the two spaced frozen surface is converted to ice, the pressure in the unfrozen intermediate zone 38 increases. This prestresses the walls of the inner shell 34, thereby placing the rock formation in compression. The amount of pre-stressing in the intermediate zone 38 is controlled by suitable pressure controls in regulating the pressure of the freezing water in the confined intermediate zone 38 between the thin ring 34 and the thick ring 36.

The multiple ring outer shell 34, 36, 38 is frozen by first providing several wells or pipes 40 which extend from the surface into the unfrozen region between the two rings 34 and 36. These wells are interconnected to a water supply system through piping. The wells are maintained at a constant pressure or to a programmed increasing pressure during freezing of the water in this intermediate zone. With proper control, freezing extends from the outer shell 36 inwardly toward the inner ring 34. The pressure in the intermediate zone then increases, and when the pressure reaches a desired level of pre-stressing, the refrigeration equipment is set at a hold position and the cavity or test chamber 10 is ready for test.

When the chamber 10 is ready for test, in either of the described systems, the specimen 18 is submerged and directed through the entry 14 into the chamber 10. The bulkhead 16 is then moved into position and the desired pressure is provided in the test chamber 10 through the pressure piping system 30. The piping system 30 is also interconnected by suitable conditions and pressure regulator (not shown) for maintaining the desired differential pressure between each section of the multiple bulkhead 16.

After testing is completed, pressure in the chamber is gradually reduced as is the differential pressure between the bulkheads 16. The bulkhead 16 is then opened and the specimen 18 is passed through the entry 14 and moved to the surface of the water.

While in the foregoing, there has been provided a detailed description of particular embodiments of the present invention it is to be understood that all equivalents obvious to those skilled in the art are to be included within the scope of the invention, as claimed.

What I claim and desire to secure by Letters Patent is:

1. A system for static pressure testing a relatively large test specimen, said system comprising an earth formation, a test chamber formed in said formation for receiving said test specimen, a frozen portion of said formation substantially completely surrounding said chamber, an entry to said test chamber for providing passage of said test specimen therethrough, means for introducing pressurized fluid to said test chamber for pressure testing said test specimen, and a pressure closure member in said entry for withstanding the pressure in said chamber so that pressure in said chamber can be raised to the desired test pressure for static pressure testing of said test specimen.

2. The system of claim 1 wherein said chamber is substantially cylindrical in shape having its central axis in a substantially horizontal position.

3. A system of claim 1 wherein said entry extends between said test chamber and a body of water, and said test chamber is below the level of said water.

4. The system of claim 1 wherein said pressurized fluid introducing means includes conduit means directed into said chamber, and water injection pumps are connected to said conduit means for introducing pressurized water into said test chamber.

5. The system of claim 1 wherein said pressure closure member comprises a bulkhead construction having multiple sections, a decreasing pressure differential being provided between each of the bulkheads, between the high pressure interior of the chamber and the low pressure exterior of said bulkhead.

6. The system of claim 1 wherein a water impermeable liner is located between the water in said chamber and the frozen earth formation surounding said chamber.

7. The system of claim 1 wherein said frozen portion comprised of an inner frozen ring, an outer frozen ring and an intermediate frozen ring, said intermediate frozen ring being under a preselected internal stress.

8. The system of claim 1 wherein means are provided for introducing a pressurized gas into said chamber.

9. A method for static pressure testing a relatively large test specimen, said method comprising the steps of excavating an earth formation for a test chamber, providing an entry to said chamber for passage of said specimen therethrough, freezing water in the portion of the earth formation surrounding said chamber, introducing said test specimen into said chamber through said entry, closing said entry for withstanding the pressure level in said chamber, and introducing pressurized fluid into said chamber so as to static pressure test said test specimen at any desired test pressure.

10. The method of claim 9 wherein said excavating step comprising excavating a test chamber which lies in a horizontal position and below water level and filling said chamber with said water.

11. The method of claim 10 wherein said excavating step additionally comprises excavating said test chamber with a cylindrical shape, and a hemispherical wall opposite said entry.

12. The method of claim 9 wherein said freezing step includes first freezing inner and outer rings surrounding said chamber, freezing an intermediate ring between said inner and outer ring, and controlling the pressure in said confined intermediate ring so as to create an internal stress for said intermediate ring.

References Cited

UNITED STATES PATENTS

| | | | |
|---|---|---|---|
| 1,825,280 | 9/1931 | Oxer | 73—40.5 R |
| 3,283,512 | 11/1966 | Hull | 61—.5 |
| 3,453,879 | 7/1969 | Chamberlin et al. | 73—148 |
| 3,505,820 | 4/1970 | Draper et al. | 73—40 X |

LOUIS R. PRINCE, Primary Examiner

W. A. HENRY, Assistant Examiner

U.S. Cl. X.R.

73—148